United States Patent [19]

Gilmore

[11] 3,792,337
[45] Feb. 12, 1974

[54] D. C. TO D. C. CONVERTER
[75] Inventor: Thomas P. Gilmore, Wauwatosa, Wis.
[73] Assignee: Allis-Chalmers Corporation, Milwaukee, Wis.
[22] Filed: Feb. 20, 1973
[21] Appl. No.: 334,151

[52] U.S. Cl. ..................... 321/2, 321/18, 321/45 R, 331/113 A
[51] Int. Cl. ............................................ H02m 3/32
[58] Field of Search... 307/247, 252 R; 321/2, 45 R; 331/113 A

[56] References Cited
UNITED STATES PATENTS

| | | | |
|---|---|---|---|
| 3,514,692 | 5/1970 | Lingle | 321/2 X |
| 2,968,738 | 1/1961 | Pintell | 321/2 X |
| 3,151,287 | 9/1964 | Pintell | 321/2 X |
| 3,646,578 | 2/1972 | Gregory | 331/113 A X |

Primary Examiner—William M. Shoop, Jr.
Attorney, Agent, or Firm—Lee H. Kaiser

[57] ABSTRACT

A D.C. to D.C. converter has a transformer with a magnetic core which is not of square loop material, a control transistor between the midtap of the transformer feedback winding and the grounded emitters of the first and second switching transistors for completing base drive circuits thereto, a current limit emitter resistor for each switching transistor, and a diode for coupling the voltage developed across the emitter resistor to the base of the control transistor. When the converter is oscillating and the core approaches saturation, a spike of current is generated which flows through the emitter resistor of the conducting switching transistor and develops a voltage which biases the control transistor off to thereby remove base drive to the switching transistors. The resulting decay in flux in the core reverses the polarity of base drive to the switching transistors. In a preferred embodiment for generating an SCR firing signal, a full wave rectifier is connected to the transformer output winding, a voltage divider is connected across the rectifier output, the voltage developed across a first portion of the voltage divider may be coupled to the SCR gating circuit, and the series arrangement of a capacitor and resistor is connected across the remainder of the voltage divider. The capacitor is initially discharged and forms a low impedance shunt to said remainder of the voltage divider so that the SCR firing signal developed across the first portion thereof has a steep leading edge and decays in magnitude with time to a constant value as the capacitor changes, whereby the average power rating of the SCR gating circuit is not exceeded.

15 Claims, 3 Drawing Figures

PATENTED FEB 12 1974　　　　3,792,337

T = ANY DESIRED WIDTH

D. C. TO D. C. CONVERTER

This invention relates to an SCR firing circuit and to a D.C. to D.C. converter particularly adapted for use as an SCR firing circuit.

BACKGROUND OF THE INVENTION

When it is desired to fire an SCR with a pulse of selectively variable time duration, it is known to either utilize a train of pulses or a D.C. pulse to gate the SCR. The former has the disadvantage that it is difficult to generate a train of pulses at a high repetition rate and not exceed the average power rating of the SCR gate, while the latter has the disadvantage that a D.C. pulse does not provide high voltage isolation for the SCR gate.

Power supplies are known using D.C. to D.C. converters to generate square wave, but known D.C. to D.C. converters require a special toroidal transformer of square loop magnetic material connected to provide regenerative switching between two power transistors, and the core and the coils of such a transformer are expensive to construct.

OBJECTS OF THE INVENTION

It is an object of the invention to provide an improved D.C. to D.C. converter which does not require a transformer having a core of magnetic material with a hysteresis curve approaching a square loop.

It is a further object of the invention to provide an improved D.C. to D.C. converter wherein the cost of the transformer core and of the transformer winding are lower than in prior art devices.

Another object of the invention is to provide an improved D.C. to D.C. converter wherein the magnetic material of the transformer can be selected to optimize the rise time of flux in the core will reverse the polarity of base drives to the switching transistors and cause the converter to oscillate.

An embodiment especially adapted for generating an SCR firing pulse with a high amplitude, steep leading edge and which decays with time to a reduced constant value has a full wave rectifier coupled to the transformer output winding, a voltage divider connected across the output of the rectifier, the gating circuit of an SCR coupled to a first portion of the voltage divider, and the series arrangement of a capacitor and a resistor connected across the remainder of the voltage divider. The capacitor initially forms a low impedance shunt to said remainder of the voltage divider so that the SCR firing pulse developed across the first portion of the voltage divider has a high magnitude leading edge and decays as the capacitor charges and removes the low impedance shunt.

BRIEF DESCRIPTION OF THE DRAWING

These and other objects and advantages of the invention will be more readily apparent from the following detailed description when considered in conjunction with the accompanying drawing wherein.

DETAILED DESCRIPTION

Figure 1:
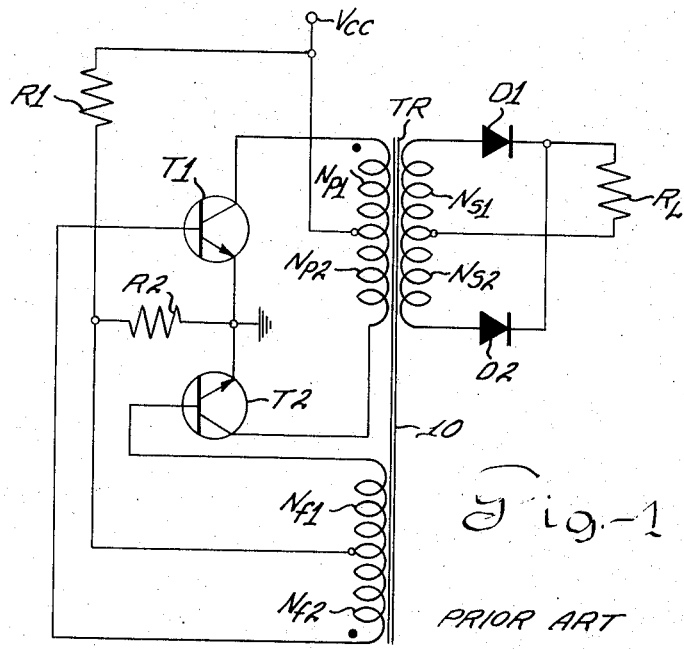
FIG. 1 is a circuit diagram of a prior art D.C. to D.C. converter.

Referring to the drawing, FIG. 1 illustrates a prior art D.C. to D.C. saturating core converter wherein the output is coupled to its input through a square core transformer TR constructed of magnetic material having a square hysteresis loop and connected so that regenerative switching exists between two switching power transistors T1 and T2. Assuming that the circuit is oscillating and transistor T1 is conducting, the supply voltage $V_{cc}$ is dropped across transformer primary winding $N_p$ connected in the collector circuit of transistor T1. The magnetic flux in the core 10 of transformer TR changes linearly, and the changing flux in the core 10 induces a voltage in the transformer feedback winding $N_{f2}$ of a polarity shown in the drawing tending to forward bias the base of transistor T1 and also induces a voltage in transformer feedback winding $N_{f1}$ of a polarity tending to reverse bias the base of transistor T2. When the square core 10 approaches saturation, the incremented permeability begins to decrease and the term $di/dt$ must increase rapidly to maintain the feedback voltage in winding $N_{f2}$. This causes a sudden spike of collector current which is limited by the amount of feedback current into the base and the transistor gain. The feedback voltage induced in winding $N_{f2}$ begins to decrease as the magnetic coupling decreases due to saturation with the result that the base drive to transistors T1 and T2 is reduced. Since transistor T1 is turning off, the induced voltages in feedback windings $N_{f1}$ and $N_{f2}$ are reversed and reverse the bias on the transistor bases so that transistor T2 is turned on and transistor T1 is turned off. As the core flux reverses, the base to emitter voltage of transistor T1 decreases to zero very rapidly and will reverse as transistor T2 begins to turn on as a result of feedback voltage reversal. The second half of the cycle begins with a polarity opposite to that of the first half cycle, and a square wave is generated in transformer secondary windings $N_{s1}$ and $N_{s2}$ on core 10 which may be rectified in full wave rectifier D1, D2 to provide D.C. power to a load $R_L$. A first biasing resistor R1 may be connected between voltage supply $V_c$ and the midtap of the transformer feedback winding, and a second biasing resistor R2 may be connected between the midtap and the grounded emitters of switching transistors T1 and T2. Biasing resistors R1 and R2 provide base drive to transistors T1 and T2 to start the circuit and also limit the base drive to the transistors after the circuit is oscillating. Core 10 of transformer TR1 should be of square loop magnetic material in order to obtain efficient regenerative switching action between transistors T1 and T2.

Figure 2:
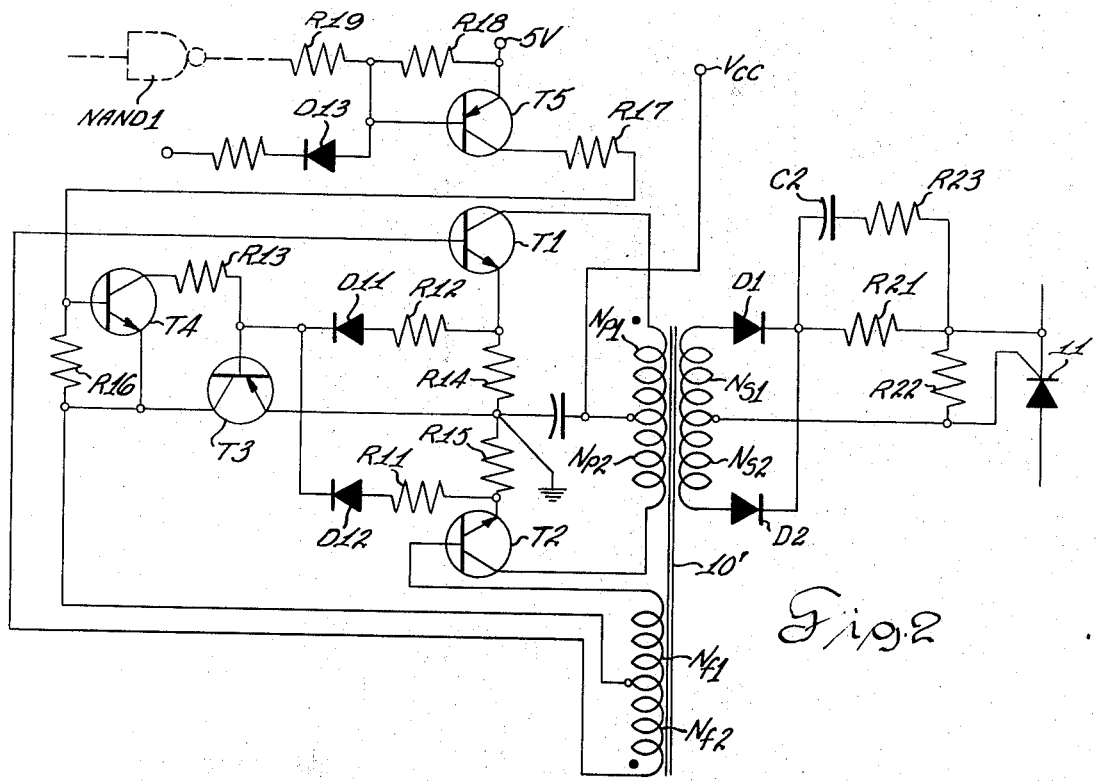
FIG. 2 is a circuit diagram of an SCR firing circuit embodying the invention.
Figure 3:
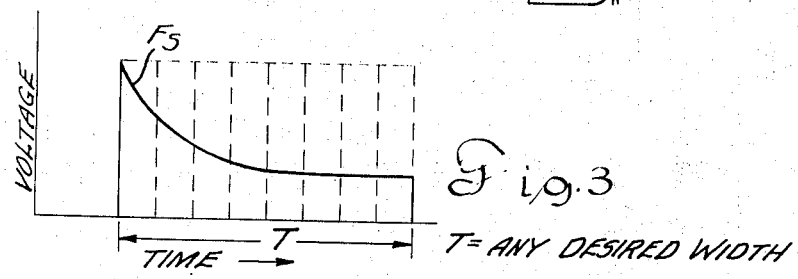
FIG. 3 shows the rectified output of the transformer of the D.C. to D.C. converter in dotted lines and an SCR firing pulse generated by the circuit of FIG. 2 in full lines.

FIG. 2 illustrates an embodiment of the invention especially adapted for firing an SCR 11 and incorporating a D.C. to D.C. converter similar to that of the prior art FIG. 1 circuit, but which has been modified to enerate an SCR gating pulse FS shown in full lines in FIG. 3 of any desired duration and having a high magnitude at its leading edge without exceeding the average power rating of the gate of SCR 11. The circuit of FIG. 2, in effect, replaces the biasing resistor R2 of the prior art converter with a control transistor T3, biasing resistors R11, R12 and R13, and diodes D11, D12. The FIG. 2 circuit also replaces resistor R1 of the prior art circuit with a pair of transistors T4 and T5 and biasing resistors R16 and R17, and it replaces core 10 of the FIG. 1 circuit with a core 10' of magnetic material which need not have a square loop B-H curve, for example, a low loss ferrite. The emitters of transistors T1 and T2 are coupled through emitter resistors R14 and R15 respectively to ground and to the emitter of control transistor T3. The base of control transistor T3 is connected through the series arrangement of diode D11 and resistor R12 to the emitter of transistor T1 and is also connected through the series arrangement of diode D12 and resistor R11 to the emitter of transistor T2. The base of control transistor T3 is connected through a biasing resistor R13 to the collector of oscillation starting transistor T4, and the collector of control transistor T3 is connected to the emitter of transistor T4 and to the midtap of the feedback winding. A resistor R16 is connected between the base and the emitter of transistor T4, and the base of transistor T4 is connected through a resistor R17 to the collector of PNP transistor T5. The emitter of transistor T5 is connected to a +5 volt potential source. A resistor R18 is connected across base and emitter of transistor T5, and it is represented that the output of a NAND logic gate NAND 1 shown in dotted lines is coupled through a resistance R19 to the base of transistor T5.

In order to inititate the SCR firing pulse, all of the inputs to gate NAND 1 are changed to logic 1 (by circuit means not shown) so that its output is converted to logic 0 to forward bias the base of PNP transistor T5 and turn it on. Conduction by transistor T5 couples the +5 volt source through resistance R17 to the base of NPN transistor T4 so that it becomes forward biased and conducts. Current flowing through conducting transistor T5, the base-emitter circuit of conducting transistor T4, and through the feedback windings $N_{f1}$ and $N_{f2}$ is coupled to the bases of switching transistor T1 and T2 and turns one of them on. Assuming that switching transistor T1 is initially turned on, the flow of its collector current through primary winding $N_{P1}$ will include a voltage in feedback winding $N_{f2}$ of the polarity shown in FIG. 2. Current will flow from ground through the emitter-base circuit of control transistor T3, through resistor R13, and through the collector-emitter circuit of transistor T4 to the midtap of the transformer feedback winding, and the flow of current through resistor R13 will develop a voltage which forward biases the base of control transistor T3 relative to its grounded base and turns it on. Current flow through emitter resistor R14 is in a direction, but not of sufficient magnitude, to bias control transistor T3 off as described hereinafter. Conduction by control transistor T3 completes the base drive circuits to switching transistors T1 and T2. Still assuming that transistor T1 initially conducts, current flow through primary winding $N_{p1}$ induces a voltage in feedback winding $N_{f2}$ which causes current flow through the emitter-collector circuit of transistor T3 and is of a polarity which forward biases the base of transistor T1 so that current will continue to increase in transistor T1. The core 10' is not of square loop magnetic material and does not rapidly saturate. The collector current in transistor T1 continues to increase until the emitter current of T1 flowing through emitter resistor R14 develops a voltage drop of a polarity and magnitude sufficient to reverse bias the base of control transistor T3.

When the B-H curve of transformer core 10' flattens and approaches saturation, the core incremental permeability $\Delta B/\Delta NI$ begins to decrease and the term $di/dt$ increases rapidly. This causes a sudden spike of collector current and also a sudden spike of emitter current through resistor R14. The voltage drop across emitter resistor R14 is coupled through resistor R12 and diode D11 to the base of control transistor T3 and is in a direction to reverse bias its base relative to its grounded emitter, and the sudden spike of emitter current is of sufficient magnitude to bias control transistor T3 off. Emitter resistor R14 thus limits the magnitude of current flow through transistor T1, and turning control transistor T3 off opens the base drive circuits to switching transistors T1 and T2 and forces the circuit to switch before transformer core 10' saturates.

The direction of current flow in transistor T1 causes a reversal of flux in magnitude core 10' which generates a voltage in feedback winding $N_{f1}$ a polarity to forward bias the base of transistor T2 and turns it on and also generates a voltage in feedback winding $N_{f2}$ of a polarity to reverse bias the base of transistor T1. The decrease of emitter current in transistor T1 lowers the voltage drop across emitter resistor R14 so that control transistor T3 again turns on and completes the base drive circuits to transistors T1 and T2. Current then increases in switching transistor T2 in a manner determined by the B-H curve of core 10' until the flow of emitter current through emitter resistor R15 develops a voltage of sufficient magnitude to again turn control transistor T3 off and thereby remove the base drive to both switching transistors T1 and T2 and thereby complete the next half cycle.

It will be apparent that alternate conduction by switching transistors T1 and T2 will induce positive and negative half cycles of a square wave in transformer secondary windings $N_{s1}$ and $N_{s2}$ which will be rectified in the full wave rectifier D1-D2. The output of rectifier D1-D2 is a series of positive, square half cycles which is shown in dotted lines in FIG. 3 and causes substantially unidirectional current flow through resistors R21 and R22 connected in series between the commoned cathodes of diodes D1 and D2 and the midtap of the transformer secondary winding. The voltage drop across resistor R22 constitutes the SCR firing signal FS shown in full lines in FIG. 3 which is coupled to the gate-cathode circuit of SCR 11. Inasmuch as one switching transistor T1 or T2 turns off and the other turns on before core 10' saturates, the peak current is kept low and a square loop magnetic material is not required for efficient operation. Since the circuit operation is not dependent upon the material of core 10', a magnetic material can be selected to optimize the rise time of the output pulse.

A capacitor C2 is connected in series with a resistor R23 of relatively low value across resistance R21. Capacitor C2 is initially discharged so that it, in effect, constitutes a low impedance shunt to resistance R21, and substantially the entire output voltage from rectifier D1-D2 appears across resistor R22 to provide a steep leading edge for the SCR firing pulse FS (shown in solid lines in FIG. 3). As capacitor C2 charges exponentially from the substantially unidirectional rectifier output (shown in dotted lines in FIG. 3), the low impedance in shunt to resistance R21 is removed, and less and less of the rectifier output voltage appears across resistor R22. Consequently the firing pulse FS applied to the SCR gating circuit tapers exponentially with time as illustrated in full lines in FIG. 3 so that a high magnitude of voltage is present at the leading edge of the pulse FS to assure firing of the SCR and the magnitude of the voltage diminishes with time so that the average power rating of the SCR gating circuit is not exceeded. The gating signal FS can be of any desired duration and is terminated by changing the output of logic gate NAND 1 to logic 1, thereby turning off transistor T5. When transistor T5 ceases conduction, the forward bias is removed from the base of transistor T4 so that it turns off and removes forward bias from the base of control transistor T3. When control transistor T3 turns off, it removes the base drive to switching transistor T1 and T2 so that the converter stops oscillating. It will thus be appreciated that the disclosed SCR firing circuit is turned on and off with a logic signal from a logic gate such as NAND 1.

The transformer provides high voltage isolation for the gate of SCR 11 which was not possible with known SCR firing circuits.

While only a single embodiment of the invention has been illustrated and described, it should be understood that I do not intend to be limited to the single embodiment for many variations and modifications thereof will be obvious to those skilled in the art.

The embodiments of the invention in which an exclusive property or privilege is claimed are defined as follows:

1. In an oscillating circuit D.C. to D.C. converter wherein first and second switching transistors are regeneratively swtiched into conduction alternately by feedback signals from a transformer provided with a midtapped primary winding having its ends coupled to the respective transistor collectors and a midtapped feedback winding inductively linked to said primary winding through said transformer magnetic core and having its ends coupled to the respective transistor bases, the improvement comprising
   control transistor means between the midtap of said feedback winding and the emitters of each said switching transistor for completing base drive circuits to said switching transistors,
   said transformer having a core which is not of square loop material, and
   current limit means associated with each said switching transistor for biasing said control transistor means off when the magnetic flux in said core approaches saturation, whereby the decay of flux in said core when said control transistor means turns off to open said base drive circuits reverses the polarity of base drives to said switching transistors.

2. In a D.C. to D.C. converter in accordance with claim 1 and including
   selectively controllable converter starting transistor means for coupling a unidirectional voltage to said feedback winding to thereby turn on one of said switching transistors,
   means responsive to the flow of current in said one switching transistor for biasing said control transistor means into conduction.

3. In a D.C. to D.C. converter in accordance with claim 1 and including means to selectively turn said control transistor means on and off.

4. In a D.C. to D.C. converter in accordance with claim 1 wherein each said current limit means includes an emitter resistor for the associated switching transistor, and means including a diode for coupling the voltage developed across said emitter resistor to the base of said control transistor means.

5. In a D.C. to D.C. converter in accordance with claim 4 and including a unidirectional voltage source connected to the midtap of said primary winding and wherein one end of each emitter resistor and an electrode of said control transistor means is coupled to one side of said unidirectional voltage source.

6. In a D.C. to D.C. converter in accordance with claim 5 wherein said one end of said emitter resistor, said one electrode of said control transistor means, and said one side of said voltage source are grounded, and the decrease in incremental permeability when said core approaches saturation results in a spike of emitter current in the conducting switching transistor which effects turning off of said control transistor means.

7. In a D.C. to D.C. converter in accordance with claim 1 for generating an SCR firing signal wherein said transformer has an output winding inductively linked to said transformer core,
   full wave rectifier means connected to said output winding,
   first and second resistors connected in series across the output of said full wave rectifier means, and
   the series arrangement of a third resistor and a capacitor being connected in shunt to said first resistor, whereby an SCR firing signal is developed across said second resistor which has a steep leading edge and decays in magnitude with time to a reduced constant value.

8. A D.C. to D.C. converter comprising, in combination,
   first and second switching transistors,
   a transformer having a magnetic core which is not of square loop material and midtapped primary, feedback, and output windings inductively linked with said core, the ends of said primary winding being respectively coupled to the collectors of said first and second transitors and the ends of said feedback winding being respectively coupled to the bases of said first and second transistors,
   a D.C. voltage source coupled to the midtap of said primary winding,
   control transistor means between the midtap of said feedback winding and the emitter of each switching transistor for completing base drive circuits to said switching transistors, and
   means associated with each switching transistor and including an emitter resistor for biasing said control transistor means off when the associated switch transistor approaches saturation, whereby the decay of flux in said core when said control transistor means turns off to open said base drive circuit reverses the polarity of base drive to said switching transistors so that they conduct alternately.

9. A D.C. to D.C. converter in accordance with claim 8 wherein one end of each said emitter resistors is coupled to one side of said voltage source, and said means for biasing said control transistor means off is actuated when said core approaches saturation and the decreases in its incremental permeability results in an emitter current spike in the conducting switching transistor.

10. A D.C. to D.C. converter in accordance with claim 8 wherein one end of each emitter resistor, one electrode of said control transistor means, and one side of said voltage source are grounded, and each said means for biasing said control transistor means off includes a diode coupling the voltage developed across the associated emitter resistor to the base of said control transistor means.

11. A D.C. to D.C. converter in accordance with claim 8 for generating an SCR firing signal and including,
- full wave rectifier means coupled to said output winding,
- a voltage divider connected across the output of said rectifier means, and
- a resistor and a capacitor connected in series across a portion of said voltage divider, whereby the voltage developed across the remainder of said voltage divider constituting said SCR firing signal has a steep leading edge and decays in magnitude with time to a constant value.

12. A D.C. to D.C. converter in accordance with claim 8 and including
- selectively controllable converter starting transistor means for coupling a unidirectional voltage to said feedback winding to thereby turn on one of said switching transistors, and,
- means responsive to the resulting flow of current in said one switching transistor for biasing said control transistor means into conduction.

13. A D.C. to D.C. converter in accordance with claim 12 wherein the emitter-collector circuit of said control transistor means is coupled between the midtap of said feedback winding and one end of each said emitter resistor, and each said means for biasing said control transistor means off includes a diode between the emitter of the associated switching transistor and the base of said control transistor means.

14. A D.C. to D.C. converter in accordance with claim 13 wherein said converter starting means includes an oscillation starting transistor having its emitter connected to said midtap of said feedback winding and its collector connected through a biasing resistor to the base of said control transistor means,
- a unidirectional voltage source, and
- transistor means selectively controllable to on and off conditions by logic voltage input signals thereto for coupling said unidirectional voltage source to the base of said oscillation starting transistor, and wherein said means for biasing said control transistor into conduction includes said biasing resistor.

15. A D.C. to D.C. converter in accordance with claim 7 and including means to selectively bias said control transistor means on and off.

* * * * *